(12) United States Patent
Hayashida (10) Patent No.: US 10,657,452 B2
(45) Date of Patent: May 19, 2020

(54) DEVICE AND METHOD FOR ESTIMATING TRAVEL SPEED

(71) Applicant: TOYOTA JIDOSHA KABUSHIKI KAISHA, Toyota-shi, Aichi-ken (JP)

(72) Inventor: Teruhide Hayashida, Tokyo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 891 days.

(21) Appl. No.: 15/127,819

(22) PCT Filed: Mar. 4, 2015

(86) PCT No.: PCT/JP2015/001143
§ 371 (c)(1),
(2) Date: Sep. 21, 2016

(87) PCT Pub. No.: WO2015/146000
PCT Pub. Date: Oct. 1, 2015

(65) Prior Publication Data
US 2017/0098167 A1    Apr. 6, 2017

(30) Foreign Application Priority Data
Mar. 25, 2014 (JP) ................. 2014-061439

(51) Int. Cl.
*G06N 5/04* (2006.01)
*G01C 21/34* (2006.01)
(Continued)

(52) U.S. Cl.
CPC ......... *G06N 5/048* (2013.01); *G01C 21/3492* (2013.01); *G06Q 10/047* (2013.01);
(Continued)

(58) Field of Classification Search
CPC ...... G06N 5/048; G06N 7/02; G01C 21/3492; G06Q 10/047; G08G 1/0112; G08G 1/0133; G08G 1/096827; G08G 1/096844
(Continued)

(56) References Cited

U.S. PATENT DOCUMENTS

2003/0069683 A1* 4/2003 Lapidot ................. G01C 21/34
701/117
2004/0230376 A1* 11/2004 Ichikawa ............... G01C 21/26
702/2
(Continued)

FOREIGN PATENT DOCUMENTS

EP         2 602 776 A1    6/2013
JP         2007-257374     10/2007
(Continued)

OTHER PUBLICATIONS

JP2009-031915A. (Year: 2009).*
(Continued)

*Primary Examiner* — Dave Misir
(74) *Attorney, Agent, or Firm* — Finnegan, Henderson, Farabow, Garrett & Dunner, LLP (57) ABSTRACT

A device that estimates the travel speed of a mobile body obtains a speed similarity of a travel speed associated with a road subject to estimation and a travel speed associated with each section of a map. The device also obtains an environment similarity degree of environment information corresponding to a section including the subject road and environment information corresponding to each section. A section similar to the section including the subject road is selected based on the total similarity degree, which is calculated based on the speed similarity and the environment
(Continued)

similarity, to set the travel speed associated with the selected section as a travel speed of a corresponding time period on the subject road.

9 Claims, 4 Drawing Sheets

(51) Int. Cl.
  *G08G 1/01* (2006.01)
  *G06Q 10/04* (2012.01)
  *G08G 1/0968* (2006.01)

(52) U.S. Cl.
  CPC ......... *G08G 1/0112* (2013.01); *G08G 1/0133* (2013.01); *G08G 1/096827* (2013.01); *G08G 1/096844* (2013.01)

(58) Field of Classification Search
  USPC .......................................................... 706/52
  See application file for complete search history.

(56) References Cited

U.S. PATENT DOCUMENTS

| | | | | |
|---|---|---|---|---|
| 2008/0004789 | A1* | 1/2008 | Horvitz | G01C 21/3492 |
| | | | | 701/117 |
| 2009/0030596 | A1 | 1/2009 | Okude et al. | |
| 2012/0059573 | A1* | 3/2012 | Nortrup | G01C 21/3667 |
| | | | | 701/118 |
| 2013/0173153 | A1 | 7/2013 | Hayashida et al. | |
| 2013/0214940 | A1* | 8/2013 | Sako | G01C 21/34 |
| | | | | 340/905 |
| 2013/0245945 | A1* | 9/2013 | Morita | G08G 1/096716 |
| | | | | 701/533 |
| 2014/0149028 | A1* | 5/2014 | Chapman | G01C 21/3691 |
| | | | | 701/118 |
| 2014/0324334 | A1 | 10/2014 | Nakashima et al. | |
| 2015/0029043 | A1 | 1/2015 | Imai et al. | |

FOREIGN PATENT DOCUMENTS

| | | |
|---|---|---|
| JP | 2009-31915 | 2/2009 |
| JP | 2010-272142 A | 12/2010 |
| JP | 2010-287251 | 12/2010 |
| JP | 2014-2596 | 1/2014 |
| WO | WO 2002/025617 A2 | 3/2002 |
| WO | WO 2013/073616 A1 | 5/2013 |

OTHER PUBLICATIONS

WO2013073616, "Information Processing System, Information Processing Device and Center Server". (Year: 2013).*
JP2014-002596. (Year: 2014).*
JP2010-272142. (Year: 2010).*
Geert et al., "A Method and Machine for Generating Map Data and a Method and Navigation Device for Determining a Route Using Map Data", WO2009053405. (Year: 2009).*

* cited by examiner

Subject Section 20

| Item | Population | National Road | | Major Regional Road | | General Road | |
|---|---|---|---|---|---|---|---|
| | | Road Length | Signal Number | Road Length | Signal Number | Road Length | Signal Number |
| Evaluation Value | 10,000 | 5km | 25 | 10km | 50 | 15km | 30 |

1st Comparative Section 21

| Item | Population | National Road | | Major Regional Road | | General Road | |
|---|---|---|---|---|---|---|---|
| | | Road Length | Signal Number | Road Length | Signal Number | Road Length | Signal Number |
| Evaluation Value | 12,000 | 5.2km | 25 | 10km | 50 | 15km | 30 |

2nd Comparative Example 22

| Item | Population | National Road | | Major Regional Road | | General Road | |
|---|---|---|---|---|---|---|---|
| | | Road Length | Signal Number | Road Length | Signal Number | Road Length | Signal Number |
| Evaluation Value | 7,500 | 4km | 15 | 7km | 30 | 12km | 15 |

Fig.3

Subject Section 10

| Time Period | | 2:00 | 3:00 | 4:00 | 5:00 | 6:00 |
|---|---|---|---|---|---|---|
| Travel Speed | | 29 | -1 | -1 | -1 | 27 |

1st Comparative Section 11

| Time Period | | 2:00 | 3:00 | 4:00 | 5:00 | 6:00 |
|---|---|---|---|---|---|---|
| Travel Speed | | 29 | 30 | 29 | 29 | 27 |

2nd Comparative Example 12

| Time Period | | 2:00 | 3:00 | 4:00 | 5:00 | 6:00 |
|---|---|---|---|---|---|---|
| Travel Speed | | 30 | 31 | 31 | 30 | 30 |

Fig.4

| Time Period | 0:00 | 1:00 | 2:00 | 3:00 | 4:00 | 5:00 | 6:00 | 7:00 | 8:00 | 9:00 | 10:00 | 11:00 | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|---|---|---|---|---|---|---|---|---|---|---|---|
| National Road (Weekday) | 29 | -1 | -1 | 31 | 31 | 31 | -1 | 25 | 22 | 21 | 21 | 22 | 24 | 25 | 24 | 23 | 23 | 23 | -1 | -1 | -1 | -1 | -1 | -1 |
| National Road (Holiday) | -1 | -1 | -1 | -1 | -1 | -1 | -1 | -1 | 29 | 27 | 26 | 24 | -1 | 25 | 24 | 24 | 23 | 23 | 24 | -1 | -1 | -1 | -1 | -1 |
| Main Regional Road (Weekday) | 28 | 29 | 29 | 29 | -1 | -1 | 29 | 24 | 21 | 21 | 21 | 21 | 24 | 24 | 21 | 21 | 21 | 21 | 22 | 24 | 25 | 26 | 27 | 27 |
| Main Regional Road (Holiday) | 27 | 27 | 28 | 29 | -1 | -1 | -1 | 29 | 29 | 26 | 24 | 24 | 24 | 25 | 23 | 24 | 23 | 22 | 24 | 26 | 28 | 27 | 28 | 28 |
| Other General Road (Weekday) | 23 | 23 | 23 | 23 | 23 | 26 | 23 | 19 | 17 | 17 | 18 | 18 | 18 | 18 | 17 | 17 | 17 | 17 | 18 | 19 | 19 | 20 | 21 | 22 |
| Other General Road (Holiday) | 22 | 23 | 23 | 24 | 23 | 25 | 24 | 22 | 20 | 19 | 19 | 19 | 19 | 18 | 18 | 18 | 18 | 18 | 18 | 19 | 21 | 21 | 22 | 22 |

Fig.5

DEVICE AND METHOD FOR ESTIMATING TRAVEL SPEED

CROSS-REFERENCE TO RELATED APPLICATIONS

This application is a national phase application of International Application No. PCT/JP2015/001143, filed Mar. 4, 2015, and claims the priority of Japanese Application No. 2014-061439, filed Mar. 25, 2014, the content of both of which is incorporated herein by reference.

TECHNICAL FIELD

The present invention relates to a device and method for estimating the travel speed of a mobile body such as a vehicle.

BACKGROUND ART

A route information processing system, that is, a navigation system that is installed in a vehicle, serves as a route guide that guides the driver of the vehicle from the present location to a destination. The route guide estimates and presents the time required to arrive at the destination using a travel speed estimated from the past travel speed on each road included in the route guide.

The travel speed on each road differs between a weekday and a holiday and depending on the time of day. It is thus difficult to estimate the subsequent travel speed from the past travel speed that changes depending on the time and day. Patent document 1 discloses one example of a technique for estimating the subsequent travel speed from the past travel speed.

The technique described in patent document 1 includes factual information of travel speeds for roads extracted from a network of roads in association with time and day. Factual information related to a first period until the present time and factual information related to a second period that does not include the present time are acquired to calculate a similarity degree of the acquired factual information related to the first period and the acquired factual information related to the second period. Then, based on the calculated similarity degree, a travel speed that is related to a third period, which follows the second period, is determined as an estimated value of the travel speed after the present time.

CITATION LIST

Patent Literature

[PTL 1]
 Japanese Laid-open Patent Publication No. 2007-257374

SUMMARY OF INVENTION

Technical Problem

In the technique described in patent document 1, the travel speed after the present time can be estimated for any road. However, if the accumulated factual information of the road is small, that is, if the amount of travel speed data is small, or if the travel speed data is missing, the similarity degree cannot be calculated to determine the estimated value of the travel speed.

It is an object of the present invention to provide a device and a method for estimating travel speed that estimates the travel speed even when the accumulated travel speed, data is insufficient.

Solution to Problem

One aspect of the present invention is a travel speed estimating device that estimates a travel speed of a mobile body. The travel speed estimating device includes a holding unit configured to hold map information, environment information associated with a map in the map information, and travel speed and time period that are associated with roads in the map information. A subject road specifying unit is configured to specify a subject road, which is subject to travel speed estimation, from the roads in the map information. A dividing unit is configured to divide the map in the map information into a plurality of sections. A speed similarity degree calculating unit is configured to calculate a speed similarity degree, which is a similarity degree of the travel speed associated with the subject road and the travel speed associated with each of the plurality of sections. An environment similarity degree calculating unit is configured to calculate an environment similarity degree, which is a similarity degree of the environment information corresponding to one of the plurality of sections including the subject road and the environment information corresponding to each of the plurality of sections. A total similarity degree calculating unit is configured to calculate a total similarity degree for each of the plurality of sections based on the calculated speed similarity degree and the environment similarity degree. An estimating unit is configured to estimate the travel speed on the subject road. The estimating unit selects a section similar to the section including the subject road from the plurality of sections based on the total similarity degree, and the estimating unit sets the travel speed associated with the selected section as a travel speed of a corresponding time period on the subject road.

A further aspect of the present invention is a method for estimating a travel speed of a mobile body. The method includes specifying a subject road, which is subject to travel speed estimation, from roads in map information; dividing a map in the map information into a plurality of sections; calculating a speed similarity degree, which is a similarity degree of a travel speed associated with the subject road and a travel speed associated with each of the plurality of sections; calculating an environment similarity degree, which is a similarity degree of environment information corresponding to one of the plurality of sections including the subject road and environment information corresponding to each of the plurality of sections; calculating a total similarity degree based, on the calculated speed similarity degree and. environment similarity degree for each section; and estimating the travel speed on the subject road. The estimating the travel speed includes selecting a section similar to the section including the subject road from the plurality of sections based on the total similarity degree and setting the travel speed associated with the selected section as a travel speed of a corresponding time period on the subject road.

Other aspects and advantages of the present invention will become apparent from the following description, taken in conjunction with the accompanying drawings, illustrating by way of example the principles of the invention.

DESCRIPTION OF EMBODIMENTS

One embodiment of a travel speed estimating device according to the present invention will now foe described with reference to FIGS. 1 to 5. The outline of the present embodiment will first be described.

Figure 1:
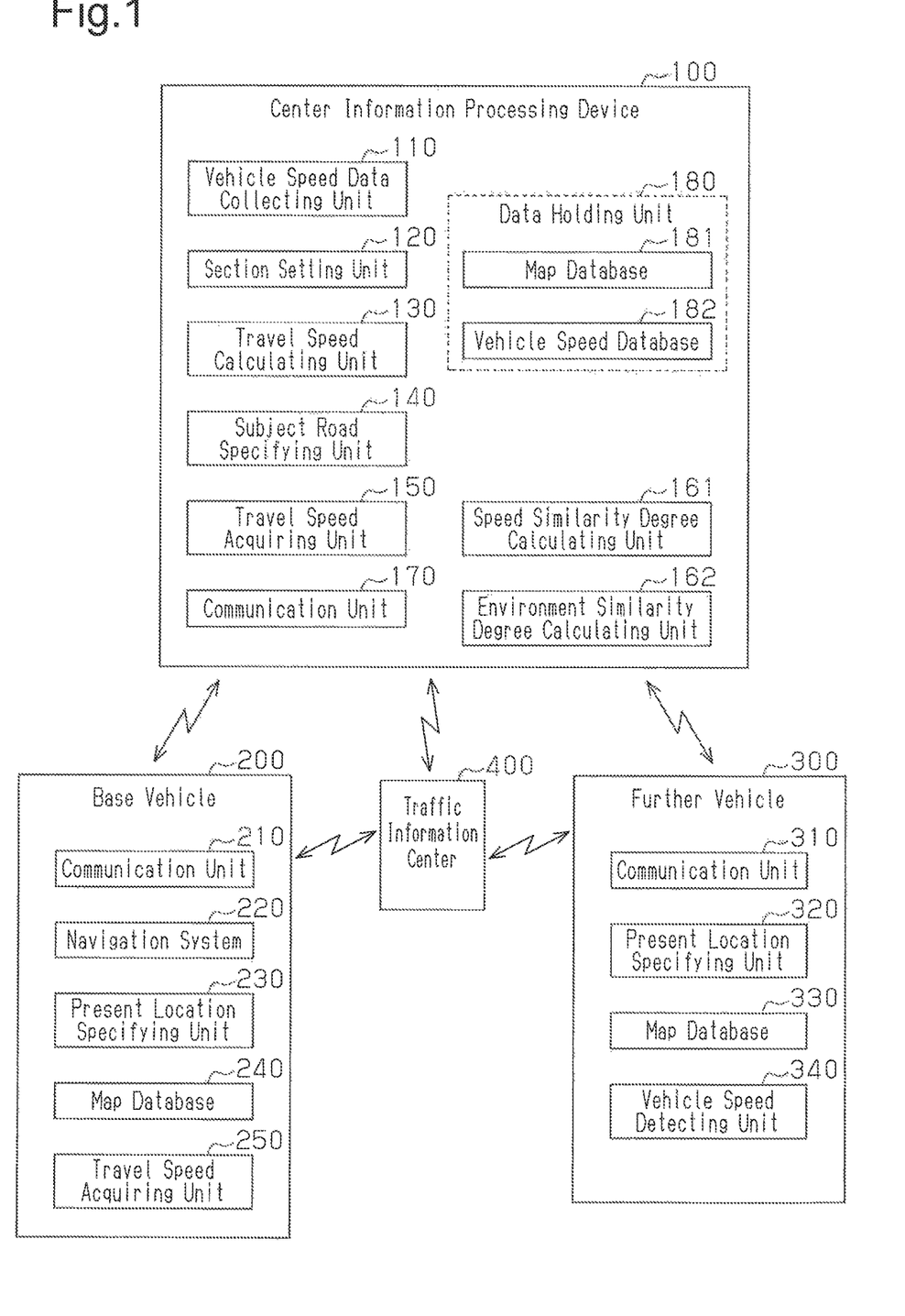
FIG. 1 is a schematic block diagram showing one embodiment of a travel speed estimating device.

FIG. 1 shows a system including a center information processing device 100 that specifies a travel speed, a base vehicle 200 that acquires the specified travel speed from the center information processing device 100, and a further vehicle 300 that transmits speed data indicating a detected travel speed serving as a speed of a mobile body to the center information processing device 100. The system also includes a traffic information center 400 that distributes traffic information to the center information processing device 100 and the like.

In the present embodiment, the center information processing device 100 acquires the travel speed estimated as the travel speed on the road the base vehicle 200 will subsequently travel and transmits the acquired travel speed to the base vehicle 200. The center information processing device 100 calculates the travel speed on the road based on the speed data received from the further vehicle 300. The base vehicle 200 calculates the travel time from the present location to a destination based on the travel speed received from the center information processing device 100.

The present embodiment will now be described in detail.

As shown in FIG. 1, the traffic information center 400 acquires traffic information on a main road such as the amount of traffic, travel speed, presence of traffic jams, and the like. Then, the acquired traffic information is transmitted from the traffic information center 400. The traffic information center 400 is provided with a computer including a computation unit and a storage unit. The traffic information center 400 acquires traffic information on a road such as the amount of traffic, the travel speed of vehicles, and whether or not there are traffic jams, based on various types of data obtained, from various types of equipment (not shown) arranged above, beside, or on the roads. The traffic information center 400 transmits the traffic information through wireless communication, an optical beacon, or the like. The transmitted traffic information can be acquired by the center information processing device 100, the base vehicle 200, the further vehicle 300, and the like.

The base vehicle 200 and one or a plurality of further vehicles 300 are automobiles, taxis, buses, trucks, and the like, Only one further vehicle 300 will be described below for the sake of convenience.

The further vehicle 300 transmits travel history including information obtained by traveling on a road to the center information processing device 100. For example, the further vehicle 300 may be a probe car set to periodically or randomly transmit the travel history to the center information processing device 100. The further vehicle 300 is provided with a computer including a computation unit and a storage unit. The computer is configured to be able to process information. The further vehicle 300 includes a communication unit 310 that can transmit the travel history to the center information processing device 100, a present location specifying unit 320 that specifies the present location using the GPS (Global Positioning System), a map database 330 including maps and roads, and a vehicle speed detecting unit 340 that detects the travel speed of the vehicle. The map database 330 is arranged in the storage unit (not shown), which may be a nonvolatile storage device. Roads are stored as node data and link data in the map database 330.

The further vehicle 300 stores the travel speed (vehicle speed) detected by the vehicle speed detecting unit 340, and the date, time, and location at which the vehicle speed is detected (present location specified by the present location specifying unit 320) in the map database 330 in association with the road (e.g., link data). That is, the vehicle speed of the further vehicle 300, together with the date and time, is associated with the road. Furthermore, the further vehicle 300 transmits the vehicle speed and the date and time stored in the map database 330 to the center information processing device 100 through the communication unit 310 together with information specifying the road, with which the vehicle speed and the date and time are associated. The information for specifying the road is, for example, a link ID for specifying the link data, and the like. The vehicle speed, the date and time, and the location may be stored in a device other than the map database 330 as long as the information is associated with the road.

In the base vehicle 200, the driver is presented with drive assistance information, such as a route guide from the present location to a destination. In the present embodiment, the base vehicle 200 presents the travel time from the present location to the destination during the route guide. The travel time is calculated from the travel speed on each road included in the travel route.

The base vehicle 200 is provided with a computer that includes a computation unit and a storage unit. The computer is configured to be able to process information. The base vehicle 200 includes a communication unit 210 that can communicate with the center information processing device 100, a navigation system 220 that guides the route from the present location to the destination, a present location specifying unit 230 that specifies the present location using the GPS, and a map database 240 including maps and roads. In the present embodiment, the base vehicle 200 also includes a travel speed acquiring unit 250 that acquires the travel speed on each road in the travel route from the present location to the destination to calculate the travel time to the destination. The map database 240 is arranged in the storage unit (not shown). Roads are stored in the map database 240 as node data and link data.

The navigation system 220 searches for routes to specify a travel route and presents the driver with drive assistance information such as a route guide corresponding to the specified travel route. The navigation system 220 includes an output unit, such as a display screen and a speaker, and an input unit, such as an operation button. When the route guide is used, the display screen shows a including the present location and all or some of the roads in the route from the present location to the destination. The input unit may be used to input the destination to set the travel route with the navigation system 220.

The navigation system 220 calculates the travel time from the present location to the destination based on the travel route and shows the calculated travel time on the display screen. The navigation system 220 acquires the travel speed on each road in the travel route through the travel speed acquiring unit 250 to calculate the travel time.

When the navigation system 220 calculates the travel time, the travel speed acquiring unit 250 acquires the travel speed on each road in the travel route from, the travel speed set for the road in the map database 240 of the base vehicle 200. In the present embodiment, the travel speed acquired from the center information processing device 100 is set in the map database 240. A larger amount of vehicle speed data, which is used for the calculation of the travel speed, increases the reliability of the travel speed for each road. The travel speed varies in accordance with various factors, such as the facilities standing along the roads. Thus, it is desirable that the travel speed on the road be updated from time to time. In the present embodiment, the base vehicle 200 acquires the travel speed on each road of the map database 240 from the center information processing device 100 through the travel speed acquiring unit 250 and updates the travel speed.

The travel speed is not necessarily set for all roads in the map database 240. If the travel speed on a road cannot be acquired from the map database 240, the travel speed acquiring unit 250 acquires the travel speed for the road from the center information processing device 100. The travel speed on the road cannot be acquired from the reap database 240 such as when a travel speed is not set for the road or when the set travel speed is old. The travel speed acquiring unit 250 transmits a request for the travel speed on the road to the center information processing device 100 through the communication unit 210. The request includes information specifying the road and may further include the date and time. The travel speed acquiring unit 250 receives the travel speed for the road from the center information processing device 100 in response to the transmitted requesting information.

The value of the travel speed for the road differs between weekdays and holidays and in accordance with the time period. Thus, the travel speed for each road is set in correspondence with each time period of the weekday and each time period of the holiday. Therefore, when acquiring the travel speed from the map database 240 or the center information processing device 100, the travel speed acquiring unit 250 specifies the date and time used for the calculation of the travel time. The date and time used for the calculation of the travel time may be the present time or an estimated time of arrival. In the present embodiment, the holidays include Saturdays, Sundays, and public holidays, which are when many commuters do not commute to work, and the weekdays including non-holiday Mondays, Tuesdays, Wednesdays, Thursdays, and Fridays, which are when many commuters commute to work.

The center information processing device 100 will now be described.

The center information processing device 100 processes various types of information to specify the travel speed for each road. The center information processing device 100 acquires the location, the date and time, and the speed data from the further vehicle 300. Then, the center information processing device 100 sets the travel speed, which is calculated based on the date and time and the speed data, for the road corresponding to the acquired location. In the present embodiment, for each road, a single travel speed is set to each of twenty-four setting frames for a weekday and each of twenty-four setting frames for a holiday. Each setting frame corresponds to a one-hour time period. Since there are many setting frames, there may be a setting frame for which a travel speed is not set due to insufficient speed data and the like. For example, the travel speed may not be set for a setting frame corresponding to a time period that is in the middle of night or early in the morning, which is when there is not much traffic.

In the present embodiment, the center information processing device 100 divides the map into sections. Based on the speed data of the further vehicle 300 set for each road in each divided section, the center information processing device 100 sets a travel speed for each road type in the same section. In detail, like each road described above, for each road type in each section, a single travel speed is set to each of twenty-four setting frames for a weekday and each of twenty-four setting frames for a holiday. Each setting frame corresponds to a one-hour time period. Since there are many setting frames, there may be a setting frame for which a travel speed is not set due to insufficient speed data and the like. For example, although each road type in the section often includes a plurality of roads, the travel speed may not be set for a setting frame corresponding to a time period that is in the middle of night or early in the morning, which is when there is not much traffic. In the present embodiment, the center information processing device 100 can estimate the travel speed for a time period in which the travel speed is not set.

The center information processing device 100 will now be described in detail.

The center information processing device 100 includes an information processing unit. The information processing unit is provided with a computer that includes a computation unit and a storage unit. The computer is configured to be able to process information. The center information processing device 100 includes a vehicle speed data collecting unit 110 that collects speed data from the further vehicle 300, a section setting unit 120 serving as a dividing unit that divides the map in the map information into a plurality of sections, and a travel speed calculating unit 130 that calculates the travel speed for each road and each section. The center information processing device 100 executes the processes described above in the collecting unit 110, the section setting unit 120, and the travel speed calculating unit 130 by executing a program in the information processing unit. The center information processing device 100 includes a communication unit 170 and a data holding unit 180. The communication unit 170 enables communication with the outside such as the base vehicle 200, the further vehicle 300. The data holding unit 180 serves as a holding unit that can hold the vehicle speed data for a road and travels speed for roads and sections.

The communication unit 170 forms a communication line from the center information processing device 100 to the base vehicle 200, the further vehicle 300, or the traffic information center 400 to enable information communication between the center information processing device 100 and the base vehicle 200, the further vehicle 300, or the traffic information center 400 through the communication line. The communication unit 170 transmits an externally received signal to the information processing unit, and transmits a signal received from the information processing unit to the outside. The communication line may be a dedicated line or a public line, or may include a wireless communication or may include a wired communication. The wireless communication includes radio communication, optical communication, and the like.

The data holding unit 180 includes a nonvolatile storage device such as a hard disc, a memory, and the like, and enables the writing and reading of the vehicle speed data, the travel speed, and the like with the information processing unit of the center information processing device 100.

The data holding unit 180 includes a map database 181, which holds the map information, and a vehicle speed database 182, which holds the speed data and the travel speed for each road and the travel speed of each section in the map information. That is, the map database 181 and the vehicle speed database 182 can write and read data with the information processing unit of the center information processing device 100.

The map database 181 is a database that holds the map information. The map information includes a map containing information related to locations such as the latitude and longitude. The map is registered to the map database 181 with displayable data and the like. In the present embodiment, a plurality of sections obtained by dividing the map is set to the map in the map information, and environment information corresponding to each section is specified.

The map information includes roads, information related to the location of each road, and information related to the road such as the location of a specific traffic element like an intersection or a traffic light. The road information for each road includes information of the road type, number of lanes, lane width, and the like, information of the intersection (intersection information), and other various types of information related to the road. In the present embodiment, the road type includes "national road", "major regional road" and "other general road". Specifically, the road is stored as node data and link data, and the various types of information described above are associated with the node data and the link data. In the present embodiment, the node data and the link data correspond to each other in the map databases 181, 330, 240. The road type only needs to classify the road according to scale, application, purpose, or the like.

The map information includes various environment information related to the environment of a region or a road. For example, the environment information includes population, road length, and number of traffic lights for each road (including information on road type and number of lanes). The environment information also specifies the population for every divided section, the road length and the number of traffic lights for each road type, and the road length and the number of traffic lights for each lane.

Figure 2:
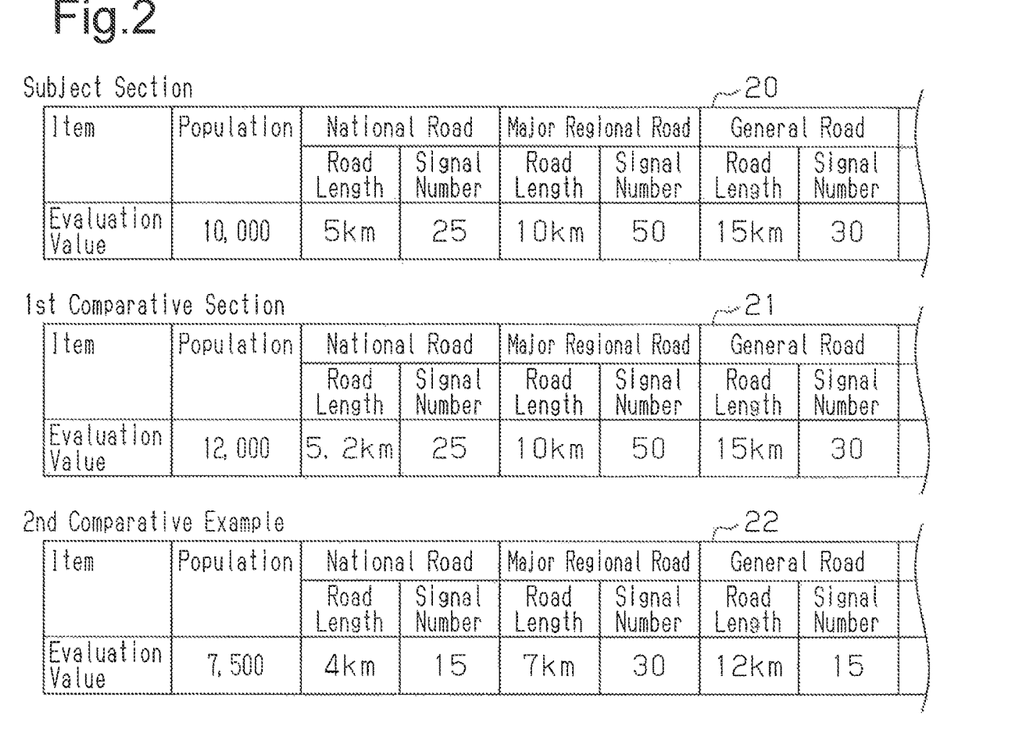
FIG. 2 is a list showing an example of environment information of a subject section and environment information of a comparative section, for which a similarity degree is calculated, in the travel speed estimating device of FIG. 1.

FIG. 2 shows an example of a combination including an item indicating the type of environment information and a corresponding evaluation value for the environment information of each section. Tables 20, 21, and 22 each show an example of environment information for a subject section, which is one of the sections, a first comparative section, and a second comparative section. That is, in table 20, "10,000 people", "5 km", "25", "10 km", "50", "15 km", and "30" are set for the evaluation values corresponding to the items "population", "road length of national road", "number of traffic lights of national road", "road length of major regional road", "number of traffic lights of major regional road", "road length of general road", and "number of traffic lights of general road" of the environment information. In table 21, "12,000", "5.2 km", "25", "10 km", "50", "15 km", and "30" are set for corresponding evaluation values in the same manner. In table 22, "7500 people", "4 km", "15", "7 km", "30", "12 km", and "15" are set for corresponding evaluation values in the same manner.

The vehicle speed database 182 holds the date and time and the speed data in association with the road specified by the location based on the location, the date and time, and the speed data of the further vehicle 300 collected through the vehicle speed data collecting unit 110. The vehicle speed database 182 includes a setting frame for holding the travel speed calculated by the speed data corresponding to each time period of a weekday and each time period of a holiday for each road.

The vehicle speed database 182 also includes a setting frame for holding the travel speed corresponding to each time period of a weekday and each time period of a holiday for each road type in each section. The travel speed is calculated based on the speed, data by the travel speed calculating unit 130. Furthermore, in the vehicle speed database 182, if the travel speed is not set in the setting frame by the travel speed calculating unit 130, the travel speed estimated by a travel speed acquiring unit 150 is set.

Figure 4:
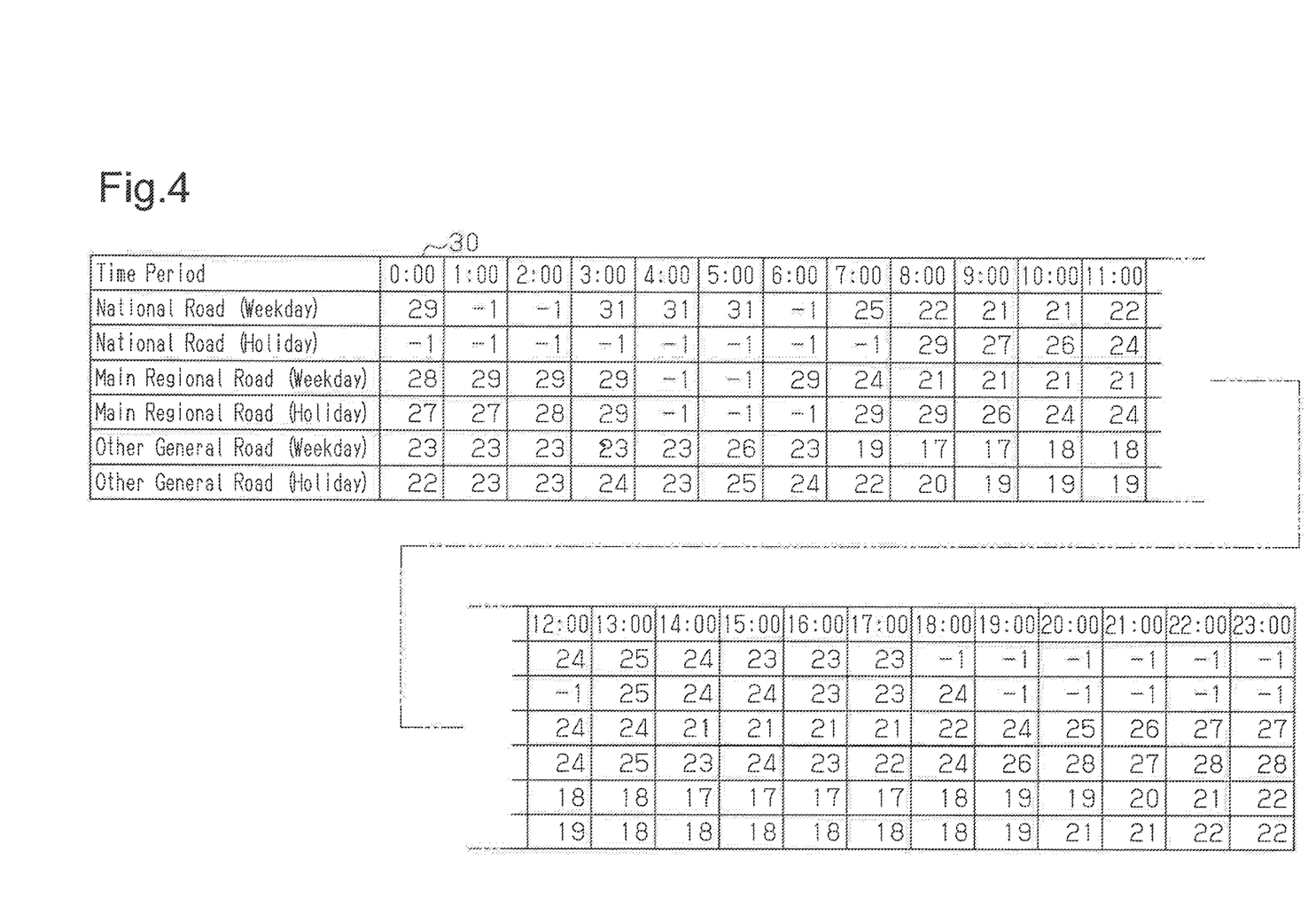
FIG. 4 is a table showing an example of travel speeds set for time periods of weekdays and holidays in one of the divided sections in a map for the travel speed estimating device of FIG. 1.

As shown in FIG. 4, the vehicle speed database 182 includes a table 30 having a setting frame for each section. In table 30, for the corresponding section, the road type is divided into three types, "national road", "major regional road", and "other general road", the day is divided into two types, "weekday" and "holiday", and the time is divided into one-hour time periods. The corresponding travel speed is set to each setting frame. The section shown in FIG. 4 includes 144 setting frames of three road types, two day types, and twenty-four time periods.

For example, an example of the travel speeds set to the setting frames is shown in table 30. That is, in table 30, a total of twenty-four one-hour period setting frames are shown in correspondence with the items of "national road" and "weekday". In this case, the travel speed is set as "29", "−1", "−1", "31", "31", "−1", "25", "22", "21", "21", "22" in order for the 12 setting frames starting from 12 a.m. (0:00), and the travel speed is set as "24", "25", "24", "23", "23", "23", "−1", "−1", "−1", "−1", "−1", "−1" in order for the 12 setting frames starting from 12 p.m. (12:00). In the same manner, in table 30, a total of twenty-four one-hour period setting frames are set in correspondence with the items of "national road." and "holiday", "major regional road" and "weekday", "major regional road" and "holiday", "other general road" and "weekday", and "other general road" and "holiday". The unit of the travel speed set in table 30 is kilometer per hour (km/h).

Some setting frames of table 30 are set with "−1", which means that the travel speed of the setting frame has not been calculated due to insufficient speed data and the like. That is, since the travel speed is calculated based on the vehicle speed data and the like of the further vehicle 300, the travel speed cannot be calculated if the accumulated amount of the vehicle speed data used for the calculation of the travel speed of the setting frame is insufficient for calculation, or if the vehicle speed data is missing.

The vehicle speed data collecting unit 110 collects the travel history including the speed data of the further vehicle 300 and saves the location, the time, and the speed data obtained from the collected travel history in the vehicle speed database 182 in association with the road. The vehicle speed data collecting unit 110 may collect traffic jam information from the traffic information center 400, and save the location, the time, and the vehicle speed data obtained from the collected traffic jam information in the vehicle speed database 182 in association with the road.

The section setting unit 120 divides the map in the map information into a plurality of sections. In detail, the section setting unit 120 divides the map in the map information into a grid of square sections. In the present embodiment, the size of each section is substantially the same, for example, one square kilometer (km). That is, the vehicle speed database 182 includes a table 30 for each section divided by the section setting unit 120.

The travel speed calculating unit 130 calculates the travel speed set to the setting frame of each road or the setting frame of each section when predetermined conditions are met. The predetermined condition includes a cyclic timing, the elapsed time from the previous calculation, request from a user, and a predetermined amount of speed data set for the road included in the section. The request from the user may include a request from the driver of the base vehicle 200, the navigation system 220, or the like.

When setting the travel speed corresponding to the road, the travel speed calculating unit 130 performs a process for adding the speed data associated with the subject road for each time period of a weekday and for each time period of a holiday and averaging the speed data to calculate the travel speed. The travel speed calculating unit 130 can set the calculated travel speed to the corresponding setting frame of the vehicle speed database 182, that is, the setting frame of the corresponding time period in a weekday or a holiday for the subject road. The travel speed calculating unit 130 can also provide the calculated travel speed as a response to the base vehicle 200 requesting the calculation.

When setting the travel speed corresponding to a section, the travel speed calculating unit 130 performs a process for adding the speed data of the road included in the subject section for each road type and for each time period of a weekday and for each time period of a holiday, that is, for each setting frame of table 30 and averaging the speed data, and the like to calculate the travel speed. The travel speed calculating unit 130 can set the calculated travel speed to the setting frame of the corresponding section of the vehicle speed database 182.

Since the travel speed calculating unit 130 calculates the travel speed based on the speed data acquired from the further vehicle 300, the travel speed cannot be calculated if the accumulated amount of speed data is not sufficient for the process of averaging or if speeds have not been accumulated (missing). In the present embodiment, if the travel speed set to the setting frame cannot be calculated, the travel speed calculating unit 130 sets "−1" to the setting frame, as shown in the setting frames of table 30 in which the travel speed of the section is set, for example.

The center information processing device 100 that estimates the travel speed will now be described.

The center information processing device 100 includes a subject road specifying unit 140 and the travel speed acquiring unit 150. The subject road specifying unit 140 specifies a subject road, which is subject to travel speed estimation. The travel speed acquiring unit 150 serves as a total similarly degree calculating unit and a estimating unit for estimating the travel speed of the subject road. To specify a comparative section serving as another section that is similar to the subject section, which is the section including the subject road, the center information processing device 100 also includes a speed similarity degree calculating unit 161 for calculating a similarity degree of the vehicle speed data of two sections and an environment similarity degree calculating unit 162 for calculating a similarity degree of the environment information of two sections. In the present embodiment, the travel speed estimating device includes the data holding unit 180, the subject road specifying unit 140, the section setting unit 120, the speed similarity degree calculating unit 161, the environment similarity degree calculating unit 162, and the travel speed acquiring unit 150.

The subject road specifying unit 140 specifies the subject road, which is the road subject to travel speed acquisition, and transmits the specified subject road to the travel speed acquiring unit 150 in response to an acquiring request for the travel speed from the base vehicle 200.

When receiving information of the subject road from the subject road specifying unit 140, the travel speed acquiring unit 150 acquires the travel speed corresponding to the received subject road, and transmits the acquired travel speed to the requestor such as the base vehicle 200 that made the request for acquiring the travel speed of the subject road.

In the present embodiment, the travel speed acquiring unit 150 acquires the travel speed of the subject road through first to fourth acquiring processes, which are processes corresponding to the accumulated state of the speed data. The first to fourth acquiring processes will now be described in detail. When the travel speed of the subject road is acquired, the travel speed acquiring unit 150 terminates the acquiring process of the travel speed of the subject road. When the travel speed cannot be acquired by the first to fourth acquiring processes, the travel speed acquiring unit 150 acquires a predetermined value set in advance for each road type as the travel speed, for example, to terminate the acquiring process of the travel speed of the subject road.

First, the travel speed acquiring unit 150 executes the first acquiring process to acquire the travel speed. The first acquiring process is the process for acquiring the travel speed of the subject road from the travel speed set to the corresponding road of the vehicle speed database 182. In the travel speed acquiring unit 150, the subject road and the time period, which becomes the acquiring subject of the travel speed, are specified. The time period is a time period of a weekday or a time period of a holiday. The specified subject road is selected from the roads of the vehicle speed database 182, and the travel speed of the specified time period in the selected road is acquired. If the speed data is accumulated in the specified time period of the subject road but the travel speed is not set, the travel speed calculating unit 130 calculates and sets the travel speed to the setting frame, and the set travel speed is acquired.

If the travel speed is not acquired in the first acquiring process, the travel speed acquiring unit 150 executes the second acquiring process to acquire the travel speed. The second acquiring process is the process for acquiring the travel speed of the subject road from the travel speed set to the subject section, which is the section including the subject road. That is, the subject section and the road type of the subject road are further specified in the travel speed acquiring unit 150. The specified subject section is then selected from the section of the vehicle speed database 182, and the travel speed of the specified time period (setting frame) is acquired from the travel speed set to the selected section. If the speed data is accumulated in the specified time period of each road corresponding to the specified road type of the subject section but the travel speed is not calculated, the travel speed calculating unit 130 calculates and sets the travel speed to the setting frame, and the set travel speed is acquired. As described above, the travel speed may not be calculated in the specified time period (setting frame) of the subject section due to insufficient vehicle speed data and the like.

In the second acquiring process, the travel speed of the subject road is acquired from the subject section including the subject road. Generally, the road type of the subject road and the road type included in the same subject section have a high probability of having similarity in the pattern of the speed data, and the environment of the subject road has a high probability of being similar to the environment of the subject section including the subject road. Thus, if a travel speed is calculated from the sum of the speed data of a road type that is the same as the subject road in the section including the subject road, it would be reasonable to use the travel speed, as the travel speed of the subject road.

If the travel speed is not acquired in the second acquiring process, the travel speed acquiring unit 150 executes the third acquiring process to acquire the travel speed. The third acquiring process is the process for acquiring the travel speed of the specified time period (setting frame) of the subject road based on the travel speed set to another time period (setting frame). In detail, the travel speed acquiring unit 150 estimates the travel speed of a specified time period (setting frame) of the subject road from the travel speed of a time period other than the specified time period of the subject section including the relevant subject road. For example, the travel speed is estimated based on the travel speed, set to the time period adjacent to the specified time period.

If the travel speed cannot be acquired in the third acquiring process, the travel speed acquiring unit 150 executes the fourth acquiring process to acquire the travel speed. The fourth acquiring process is the process for acquiring the travel speed of the specified time period (setting frame) of the subject road based on the travel speed set to the comparative section. The fourth acquiring process can be executed under the condition that the travel speed cannot be acquired in the second acquiring process. In detail, the travel speed acquiring unit 150 estimates the travel speed of a specified time period (setting frame) of the subject road from the travel speed set to the same time period of a comparative section that is similar to the subject section. Thus, in the fourth acquiring process, a comparative section similar to the subject section is specified.

The process in which the travel speed acquiring unit 150 specifies a section similar to the subject section will now be described. The travel speed acquiring unit 150 obtains the similarity degree of the speed and the similarity degree of the environment information of the comparative section with respect to the subject section. Based on the obtained similarities, the travel speed acquiring unit 150 calculates the total similarity degree used to determine the similarity with the subject section. For example, the similarity degree increases as the similarity with the subject section becomes higher. The travel speed acquiring unit 150 acquires the similarity degree of the speed from the speed similarity degree calculating unit 161, and acquires the similarity degree of the environment information from the environment similarity degree calculating unit 162. That is, the speed similarity degree calculating unit 161 can calculate the similarity degree of the speed, and the environment similarity degree calculating unit 162 can calculate the similarity degree of the environment information. After acquiring the similarity degree of the speed and the similarity degree of the environment information, the travel speed acquiring unit 150 calculates the total similarity degree. The total similarity degree is calculated based on the following equation (1) including the similarity degree of the speed, the similarity degree of the environment information, a weight coefficient A for the similarity degree of the speed, and a weight coefficient B for the similarity degree of the environment information.

$$\text{total similarity degree} = \text{similarity degree of speed} \times A + \text{similarity degree of environment information} \times B \quad (1)$$

Here, A+B=1 is satisfied.

That is, in the present embodiment, the total similarity degree is calculated in a manner a relative importance degree between the similarity degree of the speed and the similarity degree of the environment information is reflected by the weight coefficients. For example, the weight coefficient A is a value that increases as the amount of speed data used in the calculation of the travel speed increases, and the weight of the similarity degree of the speed is increased. This is because if the amount of speed data used in the calculation of the travel speed is large, the accuracy of the travel speed set to the relevant section is high, and the accuracy of the similarity degree based on the travel speed of high accuracy is also high.

The weight coefficient A is a value that decreases as the amount of speed data used in the calculation of the travel speed decreases, and the weight of the similarity degree of the speed is decreased. This is because if the amount of speed data used in the calculation of the travel speed is small, the accuracy of the travel speed set to the relevant section is low, and the accuracy of the similarity degree based on the travel speed of low accuracy is also low.

Furthermore, for example, the weight coefficient A may be set to a large value to increase the weight of the similarity degree of the speed when the amount of speed data used in the calculation of the travel speed is large, and the weight coefficient A may be changed to a small value to lower the weight of the similarity degree of the speed when the amount of speed data is small.

In the present embodiment, the weight of the similarity degree of the speed can be changed according to the accumulated amount of speed data in each section. In other words, the accumulated amount of speed data can be reflected on the similarity degree of the speed through the weight coefficient A.

The travel speed acquiring unit 150 calculates the total similarity degree and selects the comparative section that is most similar to the subject section based on the calculated total similarity degree. The travel speed acquiring unit 150 acquires the travel speed corresponding to the road type that is the same as the subject road and the specified time period that is the same as the subject road from the selected comparative section, and assumes the acquired travel speed as the travel speed of the subject section. The acquired travel speed of the subject section is assumed as the travel speed on the subject road.

The speed similarity degree calculating unit 161 and the environment similarity degree calculating unit 162 will now be described. The speed similarity degree calculating unit 161 calculates the similarity degree of the speed of the comparative section with respect to the subject section. The comparative section is a section other than the subject section. The environment similarity degree calculating unit 162 calculates the similarity degree of the environment information of the comparative section with respect to the subject section.

The speed similarity degree calculating unit 161 acquires the travel speeds for a whole day from each of the subject section and the comparative section. The acquired travel speeds are set for a road type that is the same as the subject road and for a day (weekend or holiday) including the specified time period for the subject road. The speed similarity degree calculating unit 161 then calculates the similarity degree of the speed set to the comparative section with respect to the speed set to the subject section by comparing the travel speeds for the whole day of the subject section and the travel speeds for the whole day of one or more comparative sections.

The similarity degree is calculated by calculating a value of a Hamming distance, a value of a Levenshtein distance, an absolute value of a difference, or the like using the respective values of the travel speeds of the same time period of the subject section and the comparative section for each of the time periods for a whole day, and accumulating the calculated values for a whole day.

Figure 3:
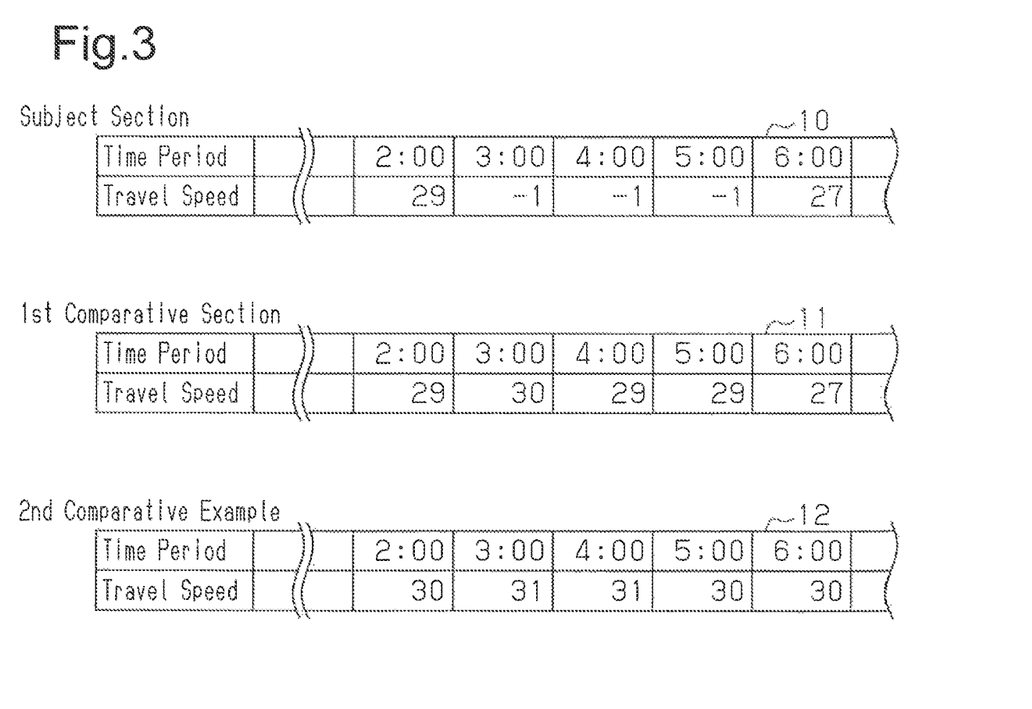
FIG. 3 is a list showing an example of a travel speed for each time period in the subject section, which is subject to travel speed estimation, and travel speed for each time period of the comparative section, for which the similarity degree is calculated, in the travel speed estimating device of FIG. 1.

FIG. 3 partially shows tables 10, 11, 12 of the travel speed set to each the subject section and the first and second comparative sections. With respect to the subject section, the travel speed corresponding to the time period is set as "29" at "2:00", "−1" at "3:00", "−1" at "4:00", "−1" at "5:00", and "27" at "6:00". In the same manner, with respect to the first comparative section, the travel speed corresponding to the time period is set as "29" at "2:00", "30" at "3:00", "29" at "4:00", "29" at "5:00", and "27" at "6:00". With respect to the second comparative section, the travel speed corresponding to the time period is set as "30" at "2:00", "31" at "3:00", "31" at "4:00", "30" at "5:00", and "30" at "6:00".

In this example, the travel speeds corresponding to the time periods of "3:00" to "5:00" of the travel speeds of the subject section need to be estimated. The similarity degree of the speed is calculated by the speed similarity degree calculating unit 161. For example, two tables 10, 11 are compared and the Levenshtein distance is calculated as "0" for the similarity degree of the speed of the subject section with respect to the first comparative section. The two tables 10, 12 are compared and the Levenshtein distance is calculated as "4" for the similarity degree of the speed of the subject section with respect to the second comparative section. In the example in which only a portion is compared, the section where the speed is most similar to the subject section is obtained as the first comparative section. In the present embodiment, the time period in which the travel speed is "−1" is not used when calculating the similarity degree, but may be used.

The environment similarity degree calculating unit 162 acquires the environment information of the subject section and the environment information of the comparative section, and compares the two acquired environment information to calculate the similarity degree of the environment information of the comparative section with respect to the subject section. The information compared as the environment information includes the population of the section, the road length and the number of traffic lights for each road type of the section, and the road length and the number of traffic lights for each lane of the section.

The similarity degree is calculated by calculating the value of the Hamming distance, the value of the Levenshtein distance, the absolute value of the difference, or the like using the respective values of various types of information of the subject section and the comparative section, and accumulating the respective calculated values.

FIG. 2 partially shows tables 20, 21, 22 of the environment information set to each of the subject section and the first and second, comparative sections. In the present embodiment, the environment similarity degree calculating unit 162 calculates the similarity degree of the environment information by comparing the numerical values, where "person" is the unit for the population and "m" is the unit for the distance. For example, the similarity degree of the environment information of the first comparative section with respect to the subject section is calculated as the Levenshtein distance of "2" (=1++1+0+0+0+0+0) by comparing the two tables 20, 21. The similarity degree of the environment information of the second comparative section with respect to the subject section is calculated as the Levenshtein distance of "11" (=3+1+1+2+1+1+2) by comparing the two tables 20, 22. In the example in which only a portion is compared, the section where the environment is most similar to the subject section is obtained as the first comparative section.

Figure 5:
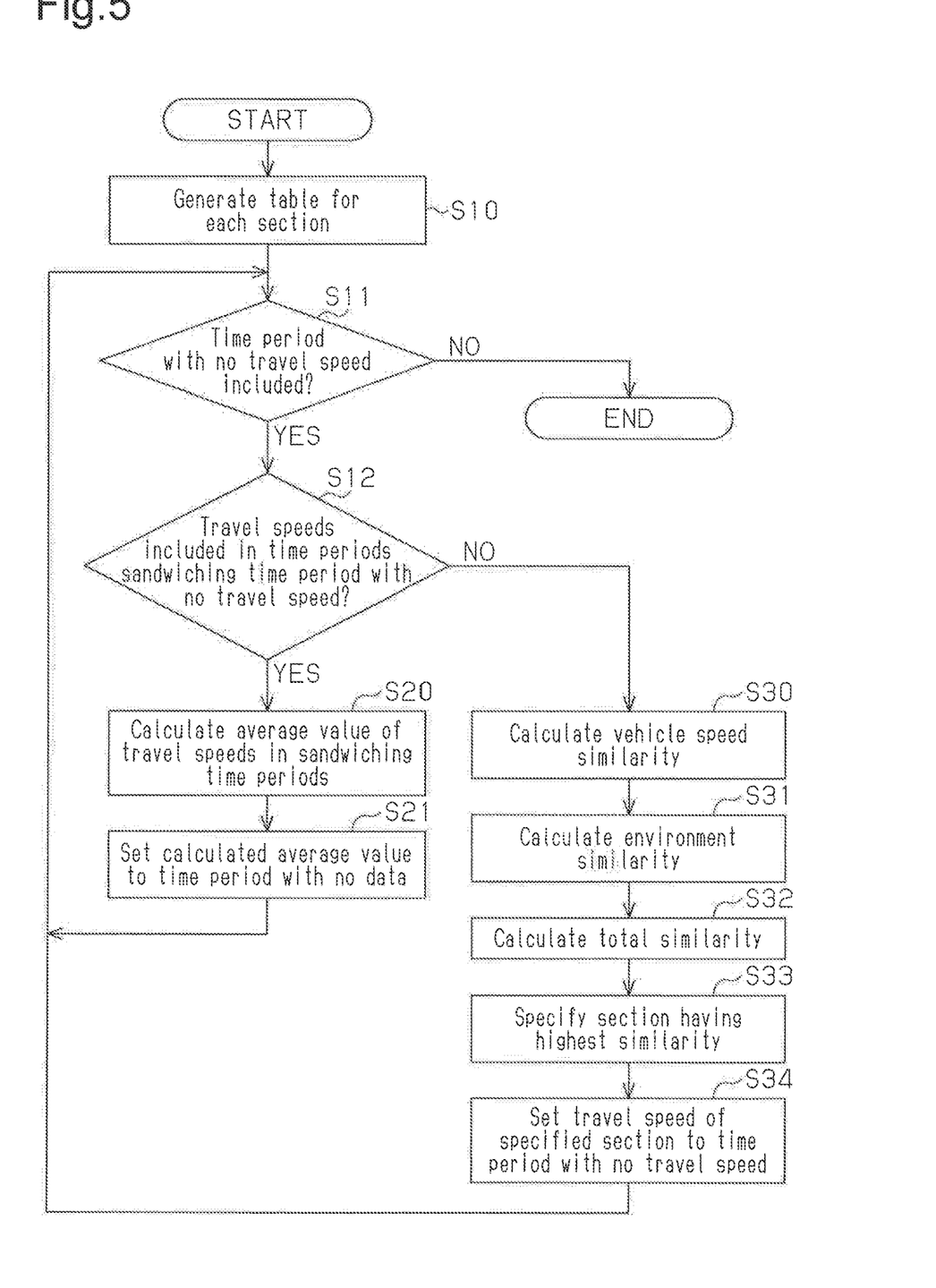
FIG. 5 is a flowchart showing the procedures for estimating the travel speed in the travel speed estimating device of FIG. 1.

The operation of the second to fourth acquiring processes of the travel speed acquiring unit 150 will now be described with reference to FIG. 5.

The center information processing device 100 executes the first to fourth acquiring processes with the travel speed acquiring unit 150 according to the conditions such as reception of the signal requesting for the travel speed from the base vehicle 200, and the like. The second to fourth acquiring processes are executed by the travel speed acquiring unit 150 when necessary. The third and fourth acquiring processes include the process of estimating the travel speed.

When the second acquiring process is executed, the center information processing device 100 generates a table for setting the travel speed of each section based on the speed data of the road (step S10). The generation of the table includes at least one of generating and re-generating the table as well as updating the set travel speed. If the table is generated under other conditions, the table does not have to be generated.

After the table is generated, the center information processing device 100 acquires the travel speed with the travel speed acquiring unit 150. That is, the travel speed acquiring unit 150 determines whether or not the subject section includes a time period without a travel speed (step S11). If determined that all time periods include a travel speed (NO in step S11), the travel speed acquiring unit 150 acquires the travel speed for the road type that is the same as the subject road and the time period corresponding to the specified time period in which the travel speed is necessary from the corresponding setting frame of the table (second acquiring process). The second acquiring process is terminated when the travel speed is acquired, and the acquiring process of the travel speed performed by the travel speed acquiring unit 150 is terminated.

If determined that there is a time period without a travel speed (YES in step S11), the travel speed acquiring unit 150 estimates the travel speed (third or fourth acquiring process). That is, since the travel speed is not acquired by the second acquiring process, the third or fourth acquiring process is executed. In this case, the travel speed acquiring unit 150 determines whether or not travel speeds are included in time periods sandwiching the time period without a travel speed (step S12). In the present embodiment, it is determined that travel speeds are included in the time periods sandwiching the time period without a travel speed only when the time period without a travel speed is a single time period or two successive time periods. Otherwise, it is determined that travel speeds are not included in time periods sandwiching the time period without a travel speed.

If determined that travel speeds are included in time periods sandwiching the time period without a travel speed (YES in step S12), the travel speed acquiring unit 150 calculates an average value of the travel speeds of the time periods sandwiching the time period without a travel speed (step S20), and sets (complements) the calculated average value as the travel speed of the time period without a travel speed (step S21) (third acquiring process). The travel speed is thus estimated based on the travel speeds of other time periods for the time period without a travel speed. The process then returns to step S11. Since a time period that does not include a travel speed no longer exists, and the travel speed is acquired from the corresponding frame of table 30, and the process for acquiring the travel speed is terminated.

For example, for "national road (weekday)" in table 30 of FIG. 4, "−1" is set to "6:00", "31" and "25" are respectively set to "5:00" and "7:00" sandwiching "6:00", and the travel speed of "6:00" is estimated as "28" (=(31+25)/2). Further, for "national road (weekday)" in table 30, "−1" is set to "1:00" and "2:00", "29" and "31" are respectively set to "0:00" and "3:00" sandwiching "1:00" and "2:00", and one travel speeds of "1:00" and "2:00" are respectively estimated as "30" (=(29+31)/2). If there are three or more consecutive non-set periods of "−1", the estimation is not performed using the travel speeds of the time periods at the left and right sides of the time periods of "−1". This is because the estimation accuracy may be low.

If determined that there are no travel speeds in the time periods sandwiching the time period without the travel speed (NO in step S12), the travel speed acquiring unit 150 executes the fourth acquiring process. In this case, the similarity degree of the vehicle speed between each of a plurality of comparative sections and the subject section is calculated (step S30). The similarity degree of the vehicle speed is calculated by the speed similarity degree calculating unit 161 when the subject section and a comparative section are specified.

The travel speed acquiring unit 150 calculates the similarity degree of the environment information between each of a plurality of comparative sections and the subject section (step S31). The similarity degree of the environment information is calculated by the environment similarity degree calculating unit 162 when the subject section and the comparative section are specified.

After the similarity degree of the vehicle speed and the similarity degree of the environment information are calculated for each of the plurality of comparative sections, the travel speed acquiring unit 150 calculates the total similarity degree of the subject section and. each comparative section (step S32). Each total similarity degree is calculated by the travel speed acquiring unit 150. In this case, the similarity degree of the vehicle speed and the similarity degree of the environment information are adjusted to be higher as the similarity increases. In the above example, the similarity degree of the vehicle speed and the similarity degree of the environment information become lower as the similarity increases. Thus, when calculating the total similarity degree, an inverse number of the similarity degree may be used or a value obtained by subtracting the similarity degree from a predetermined value may be used. For example, if the similarity degree is "0", the inverse number is not specified. In this case, the total similarity degree may be set as "2". The value of the similarity degree may be adjusted to increase as the similarity increases to calculate the total similarity degree. As described above, the travel speed acquiring unit 150 changes the weight coefficient A according to the accumulated amount of vehicle speed data set for the subject section and the comparative section.

The weight coefficient A can be changed based on various conditions. An example will now be described. An initial value of the weight coefficient A is "0.5". For example, the weight coefficient A is increased by "0.1" when the accumulated amount of the vehicle speed data is greater than or equal to a first predetermined value, and increased by "0.2" when the accumulated amount of the vehicle speed data is greater than or equal to a second predetermined value, which, is greater than the first predetermined value. The weight coefficient A is decreased by "0.1" when less than or equal to a third predetermined value, which is less than the first predetermined value. For example, the weight coefficient A may be increased by "0.1" when the number of time periods in which the accumulated amount of the vehicle speed data is greater than or equal to a fourth predetermined value is five or greater and the weight coefficient A may be decreased by "0.1" when the number of time periods in which the accumulated amount of the vehicle speed data is greater than or equal to a fourth predetermined value is two or less. Further, for example, the weight coefficient A may be increased by "0.1" when the difference in the accumulated amount of vehicle speed data between time periods is small, and the weight coefficient. A may be increased by "0" when the difference in the accumulated, amount of vehicle speed data between time periods is large. Thus, the total similarity degree is expected to be correctly calculated by adjusting the weight coefficient A in relation with the accumulated amount of the vehicle speed data.

The travel speed acquiring unit 150 specifies the section in which the total similarity degree is the highest based on the values of the total similarity degree (step S33). That is, the specified section in which the total similarity degree is the highest becomes a selected section selected to complement the travel speed of the subject section. Thus, the selected section that is similar to the subject section is specified based on the similarity degree of the vehicle speed and the similarity degree of the environment information. The travel speed of the specified selected section is set to a time period that does not include a travel speed in the subject section. That is, the travel speed of the specified selected section is complemented by the travel speed of the corresponding time period of the selected section (step S34). For example, in FIG. 3, the travel speeds set as "−1" for "3:00", "4:00", and "5:00" in table 10 of the subject section are complemented with the respective travel speeds "30", "29", and "29" of "3:00", "4:00", and "5:00" in table 11 of the first comparative section.

The center information processing device 100 may thus estimate the travel speed even for a road in which the accumulation of the travel speed is insufficient.

The travel speed estimating device and the travel speed estimating method in the present embodiment have the advantages described below.

(1) The travel speed of the subject road is estimated based on the travel speed of the corresponding time period in the section selected based on the similarity degree of the speed and the similarity degree of the environment information. If the similarity degree of the speed is high, the road in the section is presumed to have a traffic condition similar to the subject road. If the similarity degree of the environment information is high, the road of the section is presumed to be in an environment similar to the subject road and have a similar traffic condition. That is, the travel speed of the subject road is estimated based on the similarity degree of the speed and the similarity degree of the environment information that influences the travel speed. Thus, the travel speed on a road may be properly estimated even when the travel speed accumulated for the road is insufficient.

When, there is a missing travel speed for the subject road, the missing speed may be estimated based on the travel speed of a selected section. Thus, even for a road in which the accumulation of the travel speed is insufficient, drive assistance that presents the travel time or the like may be performed based on the travel speed that is estimated as described above. Each time period may have any length, for example, one hour, two hours, three hours, or longer. The length of the time period may also be 30 minutes, 15 minutes, 10 minutes, 5 minutes, or shorter. The length of the time period may be extended late at night, for example.

(2) The speed, which is obtained by averaging travel speeds in each time period for roads included in each section, is used as the travel speed for each time period of the section. Thus, even if the section includes a plurality of roads, the travel speed for the section can be calculated.

(3) When a section has a traffic condition that is similar to the subject road, there is a high probability that the travel time in the section will be similar to the travel time in the subject road for each time period. Thus, a highly accurate speed similarity may be calculated by comparing the travel speeds of the subject road and the travel speed of the section.

(4) The application of the weight coefficients A, B balances the speed similarity degree and the environment similarity degree when calculating the total similarity degree. This allows the total similarity degree to be calculated in a further preferred manner.

(5) The weight coefficient A applied to the speed similarity degree and the weight coefficient B applied to the environment similarity degree are set so that the sum of the weight coefficients A and B is equal to a fixed value (A+B=1). This increases the stability for the value of the calculated total similarity degree.

(6) The speed similarity degree that is calculated based on a section having a large amount of data is highly accurate. Thus, it can be expected that the accuracy is increased for the total similarity degree calculated by setting each weight coefficient in accordance with the amount of data.

(7) The travel speed corresponding to a time period in which the travel speed cannot be calculated for the subject road is easily estimated by complementing the travel speed for the corresponding time period of the selected section.

(8) The population, the road length and number of traffic lights for each road type, and the road length and number of traffic lights for each lane affect the traffic conditions. Thus, the reliability is increased when calculating the similarity degree of the environment information based on these factors.

(9) The travel speed differs in accordance with the read types, which are categorized into national roads, major regional roads, and other general roads. Thus, the comparison of the similarity degree of the travel speed between roads of the same types increases the probability of the selection of a travel speed in a section having higher similarity to the subject road.

Other Embodiments

The embodiment described above may be modified as follows.

In the above embodiments, the information for specifying the road is a link ID. Instead, as long as the road can be specified in the center information processing device, the information for specifying the road may be a latitude/longitude, a coordinate unique to the map database, and the like. This increases the degree of design freedom for the travel speed estimating device.

In the above embodiment, the further vehicle 300 transmits the vehicle speed, the date and time, and the information for specifying the road stored in the map database 330 to the center information processing device 100. Instead, as long as the center information processing device can acquire the vehicle speed and location of the further vehicle and the date and time, the further vehicle can sequentially transmit the acquired vehicle speed to the center information processing device together with the present location. The date and time of the sequentially received information may be specified by the center information processing device. Alternatively, the further vehicle may also transmit the date and time. This increases the degree of design freedom for the travel speed estimating device.

In the above embodiment, when the travel speed is set to the road of the map database 240, the base vehicle 200 uses the travel speed to calculation the travel time. Instead, the base vehicle may acquire the travel speed on the road from the center information processing device for each calculation of the travel time. This improves the degree of design freedom for the travel speed estimating device.

In the above embodiment, the base vehicle 200 acquires the travel speed on each road of the map database 240 from, the center information processing device 100 and updates the travel speed. Instead, when a great amount of vehicle speed data is accumulated in the base vehicle, the travel speed on each road of the map database may be calculated and set by the base vehicle. This improves the degree of design freedom for the travel speed estimating device.

In the above embodiment, the time period has a length of one hour. Instead, the time period may have any length such as two hours, three hours, or longer. The length of the time period may also be 30 minutes, 15 minutes, 10 minutes, 5 minutes, or shorter. The length of the time period may be extended late at night, for example. This increases the degree of design freedom for the travel speed estimating device.

In the above embodiment, each grid section has a size of 1 square km. Instead, the size of each grid section may be smaller than or larger than 1 square km. This increases the degree of design freedom for the travel speed estimating device.

In the above embodiment, each section has a square shape. Instead, the shape of each section may be a triangle, a hexagon, or the like. The sections may partially overlap one another. When the map is divided, an area that is not included in any of the sections may be formed. In such a case, the section may be divided into any shape such as a polygon other than a circle or a square. Alternatively, the section may be divided into administrative districts such as cities, counties, and towns. This widens the application range of the travel speed estimating device.

In the above embodiment, each section has substantially the same size. Instead, the sections may be of different sizes. Even if different sections have different sizes, two sections can be compared by making corrections that take into view the difference in size. That is, two sections may be compared that are divided in accordance with administrative districts. This widens the application range of the travel speed estimating device.

In the above embodiment, the speed data is averaged to calculate the travel speed. However, the travel speed may be calculated through processes other than averaging as long as an appropriate value can be calculated for the travel speed. This increases the degree of design freedom for the travel speed estimating device.

In the above embodiment, the similarity degree of the travel speed is calculated based on the travel speed for a whole day. Instead, the similarity degree of the travel-speed may be calculated by comparing the travel speeds for two days or the travel speeds for less than one day. Further, a predetermined time such as 12 hours before or after a subject time period may be subject to comparison. This increases the degree of design freedom for the travel speed estimating device and increases the estimation accuracy.

in the above embodiment, the similarity degree of the speed and the similarity degree of the environment information are calculated by the value of the Hamming distance, the value of the Levenshtein distance, or the absolute value of the difference. Instead, the similarity degree of the speed may be calculated through other processes as long as the similarity degree of the speed can be obtained. This increases the degree of design freedom for the travel speed estimating device.

In the above embodiment, the environment information includes the population of the section, the road length and number of traffic lights for each road type in the section, and the road, length and number of traffic lights for each lane in the section. Instead, as long as the environments can be compared, the environment information need only include at least one of the population of the section, the road length and number of traffic lights for each road type in the section, and the road length and number of traffic lights for each lane of the section. This increases the degree of design freedom for the travel speed estimating device.

In the above embodiment, a section similar to the subject section is specified according to the similarity degree of the vehicle speed and the similarity degree of the environment information. Instead, a section similar to the subject section may be specified based on only the similarity degree of the vehicle speed or only the similarity degree of the environment information. In this case, weight may be reflected on the similarity degree of the vehicle speed. This increases the degree of design freedom for the travel speed estimating device.

In the above embodiment, the total similarity degree is calculated in view of the weights of the similarity degree of the vehicle speed and the similarity degree of the environment information. Instead, the total similarity degree may be calculated without taking into view at least one of the weights of the similarity degree of the vehicle speed and the similarity degree of the environment information. This increases the degree of design freedom for the travel speed estimating device.

In the above embodiment, the third acquiring process is executed when there is no travel speed for one time period or two successive time periods but travel speeds are provided for periods sandwiching the time period having no travel speed. Instead, the third acquiring process may be executed when there is no travel speed in three or more successive time periods if travel speeds are provided for time periods sandwiching the time periods having no travel speeds. This increases the degree of design freedom for the travel speed estimating device.

In the above embodiment, the fourth acquiring process is executed after the third acquiring process. Instead, the fourth acquiring process may be executed without executing the third acquiring process. This increases the degree of design freedom for the travel speed estimating device.

The above embodiment calculates the similarity degree of speed from the travel speed of the subject section and the travel speed of the comparative section. Instead, the similarity degree of speed may be calculated from the travel speed of the subject road and the travel speed of the comparative section. Since the subject section is the section including the subject road, the travel speed of the subject road is a travel speed associated with the subject road. This increases the degree of design freedom for the travel speed estimating device.

In the above embodiment, the center information processing device 100 includes the vehicle speed data collecting unit 110, the section setting unit 120, the travel speed calculating unit 130, the subject road specifying unit 140, the travel speed acquiring unit 150, the speed similarity degree calculating unit 161 and the environment similarity degree calculating unit 162. Instead, as long as the travel speed including estimation can be acquired, the vehicle speed data collecting unit, the section setting unit, travel speed calculating unit, the subject road specifying unit, the travel speed acquiring unit, the speed similarity degree calculating unit, and the environment similarity degree calculating unit may be partially or entirely integrated. Alternatively, they may be partially or entirely divided into smaller units. This increases the degree of design freedom for the travel speed estimating device.

In the above embodiment, the center information processing device 100 estimates the travel speed. Instead, as long as the travel speed can be estimated, such functions and processes may be partially implemented in the base vehicle. This increases the degree of design freedom for the travel speed estimating device.

In the above embodiment, the center information processing device 100 estimates the travel speed. Instead, a portable information processing device, such as a portable telephone, a smartphone, or a tablet, may estimate the travel speed. Such portable information processing device may configure the center information processing device or be installed in the base vehicle. This widens the application range of the travel speed estimating device.

In the above embodiment, the base vehicle 200 and the further vehicle 300 are automobiles. Instead, if the travel speed in a route needs to be estimated, the travel speed estimating device may be used in a route guide device for robots, bicycles, pedestrians, and the like. This widens the application range of the travel speed estimating device.

The invention claimed is:

1. A travel speed estimating device that estimates a travel speed of a mobile body, the travel speed estimating device comprising:

a holding unit configured to hold map information, environment information associated with a map in the map information, and travel speed and time period that are associated with roads in the map information;

a subject road specifying unit configured to specify a subject road, which is subject to travel speed estimation, from the roads in the map information;

a dividing unit configured to divide the map in the map information into a plurality of sections;

a speed similarity degree calculating unit configured to calculate a speed similarity degree, which is a similarity degree of the travel speed associated with the subject road and the travel speed associated with each of the plurality of sections;

an environment similarity degree calculating unit configured to calculate an environment similarity degree, which is a similarity degree of the environment information corresponding to one of the plurality of sections including the subject road and the environment information corresponding to each of the plurality of sections;

a total similarity degree calculating unit configured to calculate a total similarity degree for each of the plurality of sections based on the calculated speed similarity degree and the environment similarity degree, wherein the total similarity degree calculating unit calculates the total similarity degree based on the speed similarity degree, the environment similarity degree, a weight coefficient applied to the speed similarity degree, and a weight coefficient applied to the environment similarity degree, and wherein the weight coefficient applied to the speed similarity degree and the weight coefficient applied to the environment similarity degree are based on a degree of importance placed on the travel speed and the environment information; and an estimating unit configured to estimate the travel speed of the mobile body on the subject road when past accumulation of the travel speed associated with the subject road is insufficient to estimate the travel speed on the subject road, wherein the estimating unit selects a section similar to the section including the subject road from the plurality of sections based on the total similarity degree, and the estimating unit sets the travel speed associated with the selected section as a travel speed of a corresponding time period on the subject road.

2. The travel speed estimating device according to claim 1, wherein the travel speed associated with each of the plurality of sections includes travel speeds respectively corresponding to a plurality of time periods, and the travel speed corresponding to each of the time periods is obtained by averaging speeds of another mobile body on a road included in each of the sections for each time period.

3. The travel speed estimating device according to claim 2, wherein the travel speed associated with the subject road includes the travel speeds respectively corresponding to the plurality of time periods, the travel speed corresponding to each time period is obtained by averaging speeds of another mobile body on the subject road for each time period; and the speed similarity degree calculating unit calculates the speed similarity degree by comparing, for each time period, the travel speed associated with the subject road and the travel speed of a corresponding time period of each of the plurality of sections.

4. The travel speed estimating device according to claim 1, wherein the weight coefficient applied to the speed similarity degree and the weight coefficient applied to the environment similarity degree are set to sum to a fixed value.

5. The travel speed estimating device according to claim 1, wherein the weight coefficient applied to the speed similarity degree is set according to an amount of data for speed for each mobile body accumulated for each of the plurality of sections.

6. The travel speed estimating device according to claim 1, wherein the estimating unit complements a travel speed on the subject road for a time period unassociated with the travel speed using the travel speed of a corresponding time period of the selected section.

7. The travel speed estimating device according to claim 1, wherein the environment information includes at least one of population of a section including the subject road, road length and number of traffic lights for each road type, and road length and number of traffic lights for each lane.

8. The travel speed estimating device according to claim 1, wherein the holding unit holds the travel speed set for each road type; and the speed similarity degree calculating unit calculates a similarity degree of the travel speed set for a road type of the subject road and, among the travel speeds associated with the plurality of sections, the travel speed corresponding to the road type of the subject road as the speed similarity degree.

9. A method for estimating a travel speed of a mobile body, the method comprising:

specifying a subject road, which is subject to travel speed estimation, from roads in map information;

dividing a map in the map information into a plurality of sections; calculating a speed similarity degree, which is a similarity degree of a travel speed associated with the subject road and a travel speed associated with each of the plurality of sections;

calculating an environment similarity degree, which is a similarity degree of environment information corresponding to one of the plurality of sections including the subject road and environment information corresponding to each of the plurality of sections;

calculating a total similarity degree based on the calculated speed similarity degree and environment similarity degree for each of the plurality of sections, wherein calculating the total similarity degree includes calculating the total similarity degree based on the speed similarity degree, the environment similarity degree, a weight coefficient applied to the speed similarity degree, and a weight coefficient applied to the environment similarity degree, and wherein the weight coefficient applied to the speed similarity degree and the weight coefficient applied to the environment similarity degree are based on a degree of importance placed on the travel speed and the environment information; and estimating the travel speed of the mobile body on the subject road when past accumulation of the travel speed associated with the subject road is insufficient to estimate the travel speed on the subject road, wherein the estimating the travel speed includes selecting a section similar to the section including the subject road from the plurality of sections based on the total similarity degree and setting the travel speed associated with the selected section as a travel speed of a corresponding time period on the subject road.

* * * * *